United States Patent
Lai et al.

(10) Patent No.: US 9,922,152 B2
(45) Date of Patent: Mar. 20, 2018

(54) COMPUTER IMPLEMENTED SYSTEM AND METHOD FOR REDUCING FAILURE IN TIME SOFT ERRORS OF A CIRCUIT DESIGN

(71) Applicant: ARM Limited, Cambridge (GB)

(72) Inventors: Liangzhen Lai, Sunnyvale, CA (US); Vikas Chandra, Fremont, CA (US)

(73) Assignee: ARM Limited, Cambridge (GB)

( * ) Notice: Subject to any disclaimer, the term of this patent is extended or adjusted under 35 U.S.C. 154(b) by 11 days.

(21) Appl. No.: 15/078,824

(22) Filed: Mar. 23, 2016

(65) Prior Publication Data

US 2017/0277817 A1 Sep. 28, 2017

(51) Int. Cl.
G06F 17/50 (2006.01)

(52) U.S. Cl.
CPC .............................. G06F 17/5045 (2013.01)

(58) Field of Classification Search
CPC .................................................. G06F 17/5045
USPC ........................................ 716/101, 102, 103
See application file for complete search history.

(56) References Cited

U.S. PATENT DOCUMENTS

| | | | | |
|---|---|---|---|---|
| 4,879,690 A * | 11/1989 | Anami et al. | ....... | G11C 11/4125 365/189.07 |
| 6,146,936 A * | 11/2000 | Manning | ............. | H01L 27/11 257/903 |
| 7,881,135 B2 * | 2/2011 | Cannon et al. | | G01R 31/318594 257/297 |
| 8,561,006 B2 * | 10/2013 | Uemura et al. | ..... | G06F 17/5045 714/704 |
| 8,972,819 B2 * | 3/2015 | Morris et al. | ....... | G06F 11/0793 714/758 |
| 9,268,637 B2 * | 2/2016 | Gifford et al. | ........ | G06F 11/106 |
| 9,281,807 B1 * | 3/2016 | Maillard et al. | . | H03K 3/356156 |
| 2002/0162086 A1 * | 10/2002 | Morgan et al. | ..... | G06F 17/5045 716/102 |
| 2008/0191769 A1 * | 8/2008 | Uemura et al. | ..... | G06F 17/5045 327/202 |

OTHER PUBLICATIONS

Baumann, "Radiation-Induced Soft Errors in Advanced Semiconductor Technologies", Dec. 2005, IEEE Transactions on Device and Materials Reliability, vol. 5, iss. 3, pp. 305-316.*
Roche et al., "Impacts of Front-End and Middle-End Process Modifications on Terrestrial Soft Error Rate", Dec. 2005, IEEE Transactions on Device and Materials Reliability, vol. 5, iss. 3, pp. 382-396.*

* cited by examiner

*Primary Examiner* — Sun Lin
(74) *Attorney, Agent, or Firm* — Pramudji Law Group PLLC; Ari Pramudji

(57) ABSTRACT

A computer-implemented system and method is provided for reducing failure-in-time (FIT) errors associated with one or more sequential devices of a circuit design for a process technology. The method comprises receiving an input data file that includes register transfer level (RTL) data of the circuit design. The RTL data includes the one or more sequential devices. The method further comprises identifying a preferred logic state for each sequential device of the one or more sequential devices. The method further comprises adjusting the one or more sequential devices based on the preferred logic state.

20 Claims, 8 Drawing Sheets

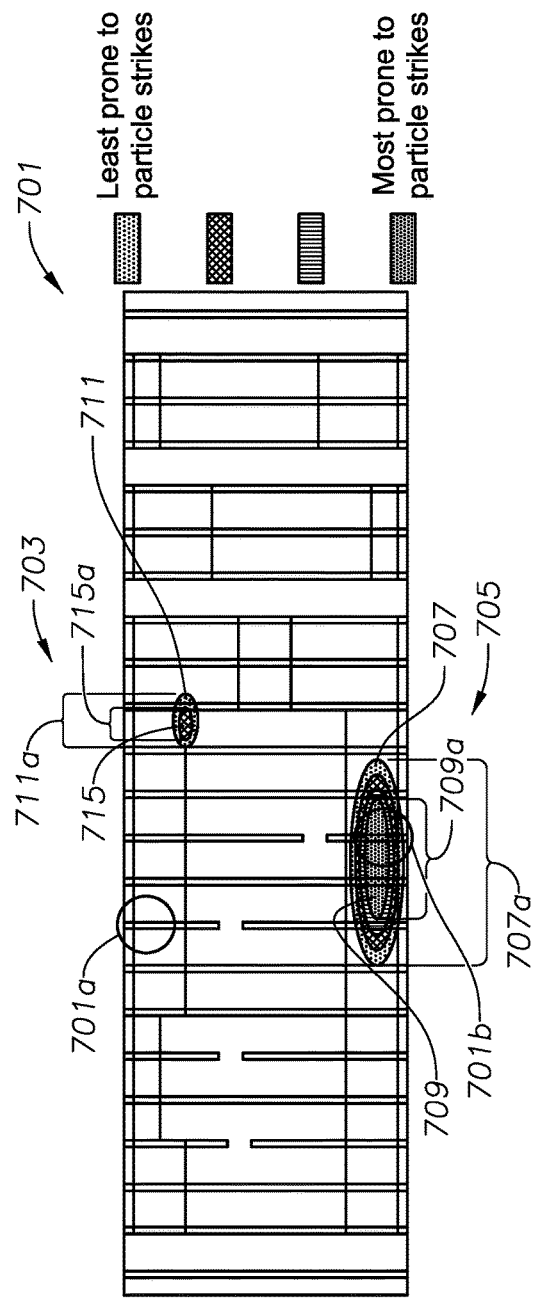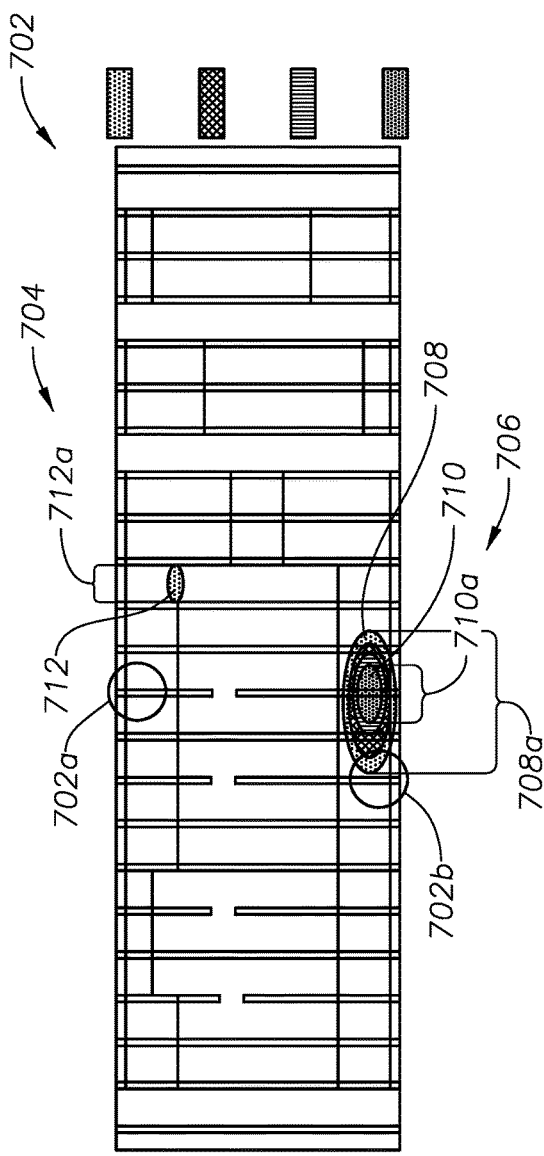
FIG. 7A
FIG. 7B

| Cells | Original MS-FF Unmodified | MS-FF: Layout Modification A | MS-FF: Layout Modification B | MS-FF: Device Modification |
|---|---|---|---|---|
| FIT with D=1 | 5.4425 | 4.3725 | 5.9525 | 2.7925 |
| FIT with D=0 | 9.4675 | 10.0375 | 7.335 | 13.0375 |

COMPUTER IMPLEMENTED SYSTEM AND METHOD FOR REDUCING FAILURE IN TIME SOFT ERRORS OF A CIRCUIT DESIGN

TECHNICAL FIELD

The present technique relates to a computer implemented system and method for reducing failure in time (FIT) errors associated with one or more sequential devices of a circuit design.

BACKGROUND

The design of integrated circuits (IC's) may involve a number of phases or steps as part of a design flow for IC design. Such design phases may include a system level design phase, digital and analog design phases, physical design and verification phases, and fabrication and packaging phases, among others. The IC design flow may also include a register transfer level (RTL) design phase that utilizes a hardware descriptive language (HDL) to provide functional models of components of an IC design. For example, it is known to provide automated tools which use a functional design of a planned IC (e.g., in the form of an RTL representation or a gate level netlist representation of the design) and a standard cell library in order to generate a circuit design (e.g., schematic and or layout representations) corresponding to the IC design.

The RTL design phase (and other phases of the IC design) may utilize various sequential elements as components of the IC. For example, sequential elements in RTL (e.g., elements declared as "reg" in a HDL such as Verilog) may be instantiated as flip-flop (FF) devices during the physical design phase (e.g., circuit implementation). The FF devices may be of different types (e.g., such as SR, JK, T and D) and are utilized as data structures for storing a data value. Typically a FF comprises one or more latches. For example, a FF may comprise a master latch and a slave latch. The circuitry that makes up a FF can also be clocked such that different parts of the FF circuitry may respond to a clock signal. The clocked FF may produce an output signal based on an input signal and the clock signal.

Flip-flop devices may be susceptible to soft errors that may be caused by the flip-flop's exposure to neutrons or alpha particles during operation. These soft errors may result in data values that are stored by the FF (e.g., data corresponding to logic values of 0 or 1) to be disturbed and/or lost. Flip-flop data failures due to these soft errors may correspond to a particular failure-in-time (FIT) rate for the FF which may be undesirably large for the IC design. Additionally, different FFs of an IC design may exhibit different soft error FIT rates. Current RTL design approaches cannot differentiate between FFs with different FIT rates. As such, current RTL design approaches cannot account for the use of different FFs in the IC design based on soft error FIT rates of sequential devices.

It would be advantageous to provide techniques to reduce the soft error FIT rates associated with sequential devices (e.g., FFs) of an IC design. Such a reduction may improve the performance and reliability of the IC design and its corresponding fabricated components. Furthermore, it would be advantageous to provide techniques for the differentiation and selection of different sequential devices as part of an RTL design phase so as to facilitate the reduction of soft error FIT rates associated with the IC design. Such techniques may improve the design efficiency and further reduce the costs associated with the design flow of the IC design.

BRIEF DESCRIPTION OF THE DRAWINGS

The present technique(s) will be described further, by way of example only, with reference to embodiments thereof as illustrated in the accompanying drawings. It should be understood, however, that the accompanying drawings illustrate only the various implementations described herein and are not meant to limit the scope of various techniques described herein.

FIG. 7A is a graph illustrating a particle strike distribution associated with an exemplary layout design associated with the present techniques and methods described herein;

FIG. 7B is a graph illustrating a particle strike distribution associated with an exemplary modified layout design used in a method in accordance with one embodiment

DETAILED DESCRIPTION

Figure 1:
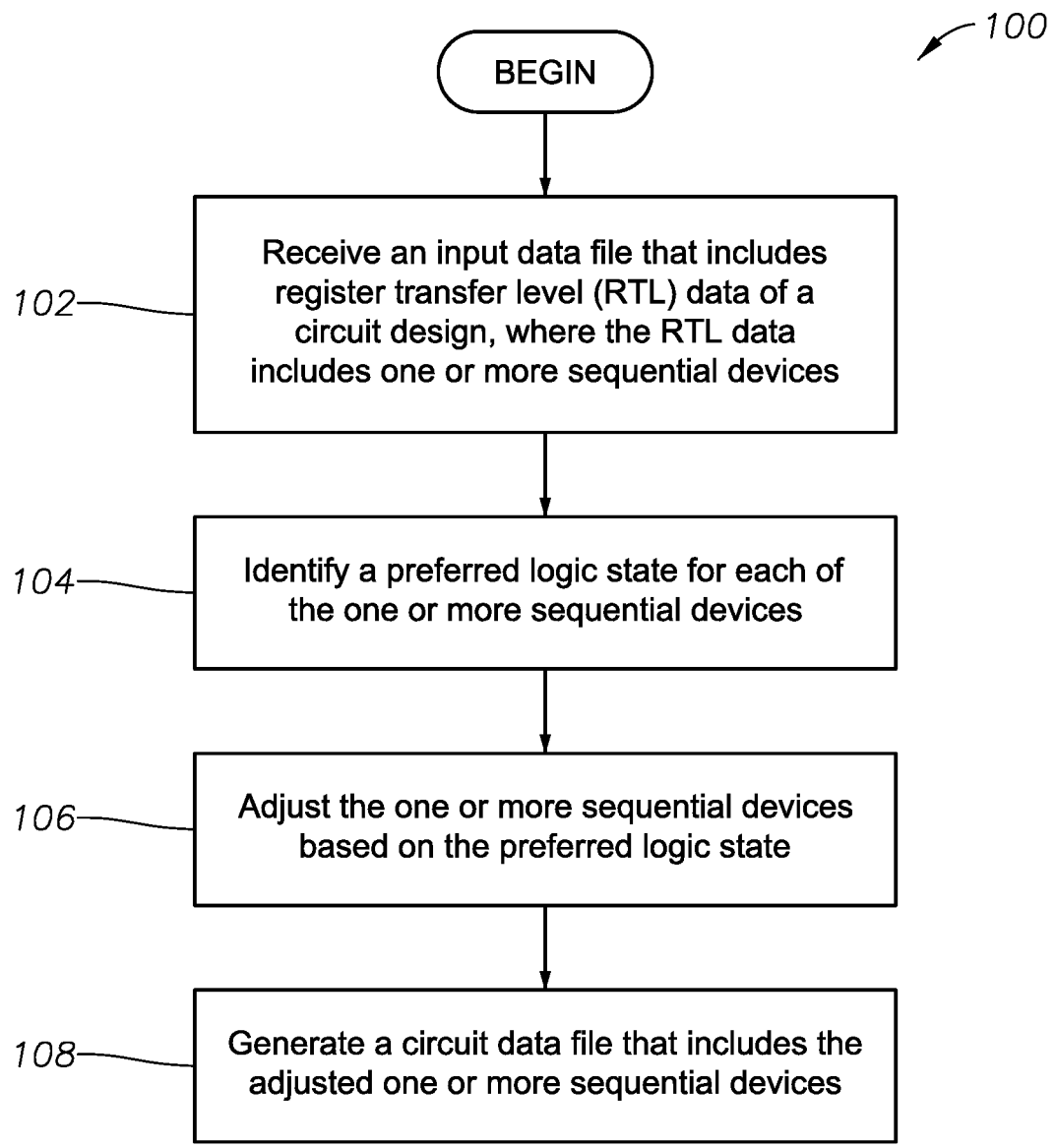
FIG. 1 is a flow chart that illustrates an embodiment of a method for reducing FIT errors associated with one or more sequential devices of a circuit design.

Before discussing the embodiments with reference to the accompanying figures, a brief description of various embodiments is provided. In one embodiment, a computer implemented method for reducing failure in time (FIT) errors associated with one or more sequential devices is described herein. The one or more sequential devices are of a circuit design for a process technology. The method includes receiving an input data file that includes register transfer level (RTL) data of the circuit design. The RTL data includes the one or more sequential devices. The method also includes identifying a preferred logic state for each of the one or more sequential devices. The method further includes adjusting the one or more sequential devices based on the preferred logic state.

In another embodiment, a device for reducing FIT errors associated with a circuit design for a process technology is described herein. The device includes a first tri-state inverter coupled between an input and a first latch of the device. The device further includes a second tri-state inverter coupled between the first latch and a second latch of the device. The FIT errors are reduced by using the device to adjust one or more sequential devices of the circuit design based on a preferred logic state associated with each of the one or more sequential devices. The one or more sequential devices are part of an input data file that includes RTL data of the circuit design.

In another embodiment, there is provided a system for FIT errors associated with one or more sequential devices. The one or more sequential devices are of a circuit design for a process technology. The system includes means for receiving an input data file that includes RTL data of the circuit design. The RTL data includes the one or more sequential devices. The system also includes means for identifying a preferred logic state for each of the one or more sequential devices. The system further includes means for adjusting the one or more sequential devices based on the preferred logic state.

In one embodiment, a method for reducing FIT errors associated with one or more sequential devices is provided so as to enable improvements in the performance and reliability of an IC design and its corresponding fabricated components. The method may also provide for the differentiation and selection of different sequential devices as part of an RTL design phase. The method may be automated to enable efficient design of the IC and its components while reducing the cycle time associated with one or more phases (e.g., RTL design phase, physical design phase, etc.) of a design flow for the IC design.

The method may be process independent such that it may be applied to various process technologies. For example, the method may be applied to current process technologies and any future process technologies having reduced process geometries. The method may be applied to process technologies that utilize various lithographic techniques (e.g., double patterning technique (DPT)). The method may be applied to process technologies that implement various types of devices such as, but not limited to, planar devices, multi-gate devices (e.g., FinFET devices), or a combination of both.

Sequential elements (e.g., FFs) of an IC may exhibit different soft error FIT rates. For example, a particular FF may exhibit a first FIT rate while holding (e.g., storing) a value corresponding to a logical 1 (e.g., a first state of the FF) and may exhibit a different FIT rate while holding a value corresponding to a logical 0 (e.g., a second state of the FF). The particular state that a FF may exhibit may depend on the type of components of the IC that the FF is associated with and/or the kind of operations the FF performs as part of the IC. Accordingly, FFs of an IC design may be in a particular logic state more often than in another logic state. In a particular embodiment, the sequential elements include flip-flops that have a master latch and a slave latch.

The method described herein for reducing FIT errors associated with one or more sequential devices may enable the identification of a preferred logic state of a FF. The method may enable the adjustment of the FF based on the FF's identified preferred logic state. In an exemplary embodiment, a simulation (and/or emulation) may be performed on one or more FFs to identify a preferred state of each of the one or more FFs. To illustrate, an RTL data file that includes the one or more FFs of an IC design may be simulated and each FF may be identified as having either a preferred state of holding a logic value 1 or a preferred state of holding a logic value 0. In a particular embodiment, the identified preferred state(s) may be based on simulations that utilize one or more operational workloads (OWs) (e.g., test-benches) associated with the IC design. In another embodiment, the identified preferred state(s) may be based on the sequential device's probability of the holding a logic value of 1 or the probability of the holding a logic value of 0.

The identified preferred logic state of the FF may be used as a basis for adjusting the FF to enable a reduction of a soft error FIT rate associated with the particular FF. For example, the method described herein may identify that a first FF has a preferred logic state of holding a logic value 1 (i.e., the FF holds a logic value 1 more strongly than holding a logic value of 0) and/or that another FF has a preferred logic state of holding a logic value 0 (i.e., the FF holds a logic value 0 more strongly than holding a logic value of 1). Based on the FF's preferred logic state, the FF may be adjusted to result in a reduced soft error FIT rate for the FF.

In a particular embodiment, adjusting the FF may include the use of a modified FF device that has a different design than the FF to be adjusted. In another embodiment, adjusting the FF may include the use of a modified layout associated with the FF to be adjusted. To illustrate, the method may identify an FF as having a preferred logic state. The method may enable the adjustment of the FF by replacing the FF with a modified FF design that is configured to have a reduced soft error FIT rate while in the preferred logic state. Alternatively or in addition to, the method may enable the adjustment of the FF by modifying a layout of the FF such that the modified layout results in a reduced soft error FIT rate for the FF. In a particular embodiment, adjusting the FF may include the use of the modified FF design, the modified layout of the FF, layout changes to the modified FF design, or any combination thereof. Such adjustments made to one or more sequential devices (e.g., FFs) may reduce the soft error FIT rate of the sequential devices and the corresponding IC design.

Current RTL design phase approaches cannot identify or distinguish between sequential devices that have a different soft error FIT rate. In a new approach, the method described herein may be performed as part of an RTL design phase to enable the identification and selection of differing FFs based on the identified preferred states of the FFs. Alternatively or in addition to, the method described herein may enable the identification and selection of differing FFs outside of an RTL design phase. For example, the method may be performed as part of one or more engineering change order (ECO) steps. The ECO steps may be associated with changes to a standard design flow. To illustrate, a standard design flow may provide netlists (e.g., schematic level and/or layout level netlists) than include the FFs of the IC design. The method described herein may utilize ECO steps to replace existing FFs of the netlist(s) with modified FFs (e.g., schematic and/or layout levels), or with adjusted layouts of the existing FFs, or a combination of both. The replacements may be based on the preferred state identified for the existing FFs.

As further described herein, it will be understood that various method(s) described herein may enable an automated mechanism for the differentiation and selection of FFs and for the reduction of soft error FIT rates associated with FFs of an IC design. These methods may reduce design cycle time associated with one or more phases of a design flow and may enable increased efficiency in the design of the IC to provide increased performance and reliability of sequential devices of an IC design. Further, the iterative and automated application of the method may improve the design productivity and reduce the time required to make changes to an existing RTL design, schematic design, layout design, or to migrate from one process technology to another. This in turn allows for additional iterations and improvements, thus improving the overall quality of the IC design flow at less cost.

Particular embodiments will now be described with reference to the figures.

Referring to FIG. 1, a flow chart that illustrates a particular embodiment of a method for reducing FIT errors associated with one or more sequential devices of a circuit design is shown and generally designated 100. The method 100 includes receiving an input data file that includes RTL data of a circuit design where the RTL data includes one or more sequential devices, at 102. For example, an RTL input data file that provides RTL representations of components of a circuit design may be received as part of an RTL design phase. In a particular embodiment, the RTL input data file may be received as part of another design phase of the IC design that is different from the RTL design phase. The RTL input data file may include representations of one or more sequential devices. The sequential device representations may correspond to one or more flip-flop (FF) devices of the IC design. In a particular embodiment, the corresponding one or more FFs may each include a master latch and a slave latch.

The method 100 also includes identifying a preferred logic state for each of the one or more sequential devices, at 104. For example, the received RTL input data file having one or more sequential devices may be processed in a manner that enables identification of a preferred logic state for each sequential device of the one or more sequential devices of the IC design. The preferred logic state may be either the state of holding (e.g., storing) a logic value of 1 or the state of holding a logic value of 0. In a particular embodiment, the identification of the preferred state(s) may be based on a probability determination associated with the sequential devices. In another embodiment, the identification of the preferred state(s) may be based on characteristics, operational modes, and/or properties of the sequential devices themselves and/or that of the IC design.

The method 100 also includes adjusting the one or more sequential devices based on the preferred logic state, at 106. For example, based on the preferred logic state identified for each sequential device, one or more sequential devices may be adjusted so as to reduce a soft error failure in time (FIT) rate associated with each of the sequential devices of the received RTL input data file. The sequential devices to be adjusted may be existing FFs of the IC design during an RTL design phase (e.g., FFs corresponding to the RTL representations of the RTL input data file), FFs yet to be synthesized for the IC design, existing FFs of the IC design outside of an RTL design phase, or any combination thereof.

Adjusting the one or more FFs may include the use of one or more modified sequential devices, the use of one or more layout modifications associated with the one or more sequential devices, or both. For example, adjusting the one or more FFs may include, based on the identified preferred state, the replacement of each of one or more existing FFs of the IC design with a modified FF device that has a different design than the FFs to be adjusted. To illustrate, a target FF may be identified as having a preferred logic state of holding (e.g., storing) a logic value of 1. The adjustment may enable the replacement of the target FF with a modified FF device that is optimized to hold a logic value 1 (e.g., holding a logic value 1 at a FF output node, conventionally designated as Q). In a particular embodiment, the adjustment may enable the replacement of another target FF (having a preferred state of 0) with a modified FF device that is optimized to hold a logic value 0 (e.g., holding a logic value 0 at a FF output node, conventionally designated as Q).

In a particular embodiment, adjusting the one or more FFs may include the synthesis of one or more modified FF devices for the IC design. In another embodiment, adjusting the one or more FFs may include the use of a modified layout associated with the FFs to be adjusted. To illustrate, the method 100 may identify an FF as having a preferred logic state. A layout of the FF to be adjusted may be replaced using a modified layout associated with the FF to be adjusted. The modified layout may be configured to have a reduced soft error FIT rate. The modified layout may be associated with a preferred logic state. Use of the modified layout as part of adjusting a target FF may result in a reduced soft error FIT rate for the FF. The adjusting the one or more FFs may occur as part of an RTL design phase. Alternatively or in addition, the adjusting the one or more FFs may occur outside of the RTL design phase. For example, adjustment may be performed as part of one or more engineering change order (ECO) steps. In a particular embodiment, the ECO steps may be associated with changes to a standard design flow.

The method 100 also includes generating a circuit data file that includes the adjusted one or more sequential devices (e.g., FFs), at 108. For example, based on the preferred logic state identified for each sequential device, one or more sequential devices may be adjusted and a circuit data file may be generated that has the adjusted one or more sequential devices. The generated circuit data file may include an RTL netlist, a schematic netlist, a layout netlist, or any combination thereof. The adjusted sequential devices of the generated circuit data file may include one or more modified sequential devices, one or more layout modifications associated with the one or more sequential devices, or a combination of both.

The method 100 may enable the reduction of soft error FIT rates associated with one or more sequential devices of an IC design. Further, the method 100 may provide for the differentiation and selection of different sequential devices as part of an RTL design phase. Such attributes of the method 100 may provide improvements in performance and reliability of an IC design as well as an improved efficiency of an IC design flow. Whilst steps 102-108 of the method 100 are shown as being performed sequentially, it will be appreciated that two or more of these steps could be performed in a different order or in parallel. Alternatively or in addition to, steps of the method 100 may be associated with other IC design steps, such as one or more engineering change order (ECO) steps.

Figure 2:
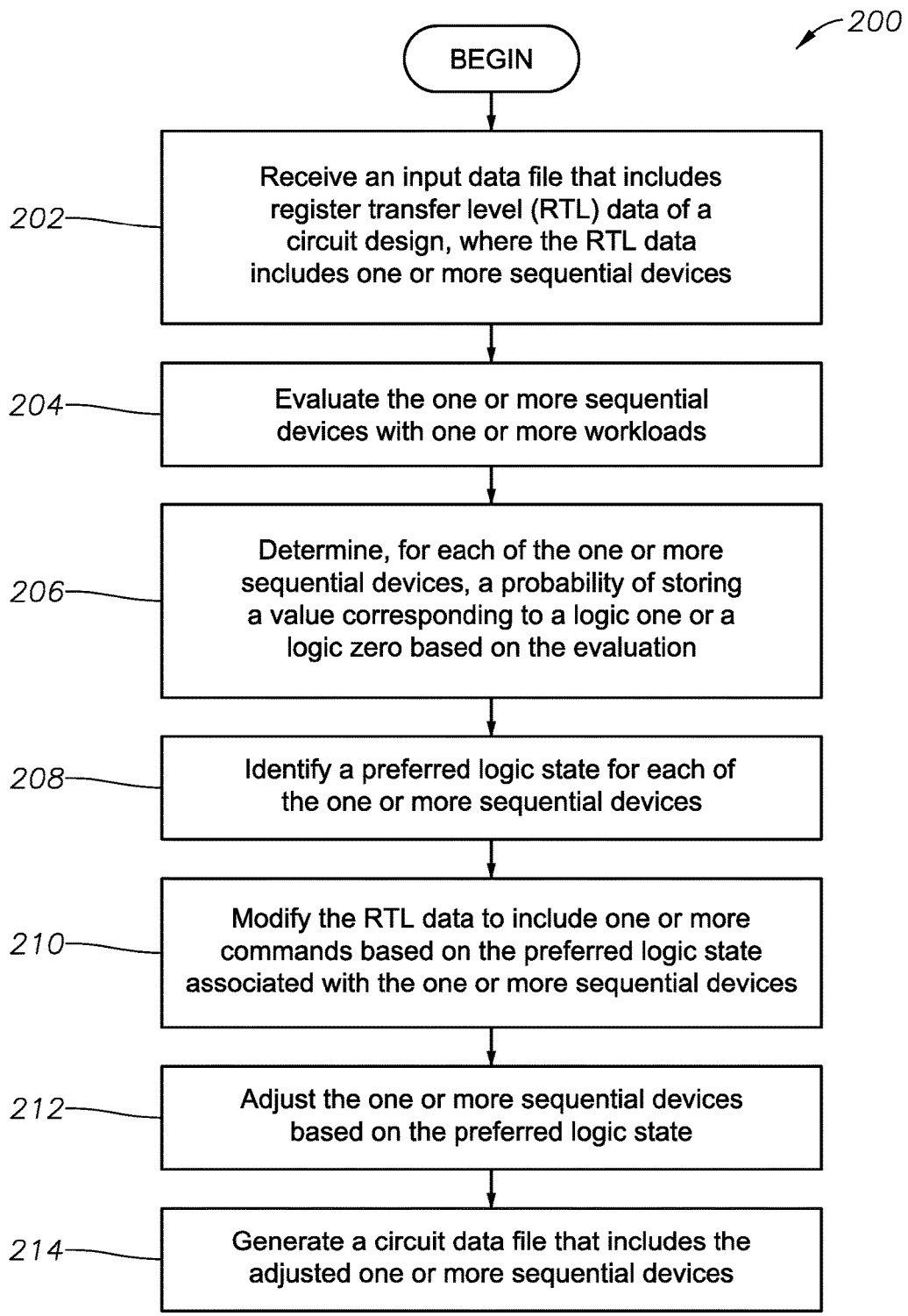
FIG. 2 is a flow chart that illustrates another embodiment of a method for reducing FIT errors associated with one or more sequential devices of a circuit design.

Referring to FIG. 2, a flow chart that illustrates another embodiment of a method for reducing FIT errors associated with one or more sequential devices of a circuit design is shown and generally designated 200. The method 200 includes receiving an input data file that includes RTL data of a circuit design where the RTL data includes one or more sequential devices (e.g., FFs), at 202. The step at 202 may substantially correspond (e.g., with similar embodiments) to the step 102 of FIG. 1.

The method 200 also includes evaluating the one or more sequential devices with one or more workloads, at 204. For example, the received RTL input data file having one or more sequential devices may be processed in a manner that enables evaluation of the one or more sequential devices. The evaluation may include the simulation and/or emulation of the one or more sequential devices with one or more operational workloads (OWs) (e.g., test-benches) that are associated with the IC design. To illustrate, one or more FFs of the IC design that correspond to the sequential device representations of the RTL input data file may be simulated utilizing one or more OWs. The OW's may be based on, but are not limited to, different operating modes, different operating conditions, different operating regions of the IC design, or a combination thereof. Alternatively or in addition to, the evaluation may be based on other parameters associated with the IC design, such as various process parameters of a process technology. The evaluation of the one or more sequential devices may provide statistical information related to the one or more sequential devices' ability to store a particular logical value.

The method 200 also includes determining, for each of the one or more sequential devices, a probability of storing a value corresponding to a logic one or a logic zero based on the evaluation, at 206. For example, the evaluation of one or more sequential devices of RTL input data with one or more operational workloads may provide statistical information related to the one or more FFs. Based on the statistical information, a determination is made for each of the one or more FFs as to the probability of the FF holding a particular logic value. To illustrate, based on the evaluation with one or more WO's simulated, a FF may be determined to have a high probability of holding (e.g., strongly storing) a logic value of 0. Based on the evaluation, a different FF may be determined to have a high probability of holding a logic value of 1.

The method 200 also includes identifying a preferred logic state for each of the one or more sequential devices, at 208. For example, the probability determinations of 206 may be used to identify a preferred state for each FF evaluated at 204. To illustrate, a FF determined to have a high probability of holding a logic value of 0 may be identified to have a preferred logic state of logic 0. Similarly, a different FF determined to have a high probability of holding a logic value of 1 may be identified to have a preferred logic state logic 1. In another embodiment, the identification of the preferred state of a FF may be based on characteristics, operational modes, and/or properties of the sequential devices themselves and/or that of the IC design. Alternatively or in addition, the identification of the preferred state of a FF may be based on the FF probability determinations, the characteristics, operational modes, and/or properties of the FF themselves and/or that of the IC design, or a combination thereof. The step at 208 may substantially correspond (e.g., with similar embodiments) to the step 104 of FIG. 1.

The method 200 also includes modifying the RTL data to include one or more commands based on the preferred logic state associated with the one or more sequential devices, at 210. For example, the received RTL input data file, having one or more sequential devices, may be modified to include one or more commands that specify a preferred logic state for each of the one or more sequential devices (e.g., FFs) of the IC design. The one or more commands may be in the form of directive pragma constructs associated with a hardware descriptive language (HDL) used for the RTL input data file. The preferred logic state specified by the one or more commands may be based on the probability determinations of step 206, FF characteristics, FF operational modes, FF properties, IC design operational modes/characteristics, or any combination thereof.

The method 200 also includes adjusting the one or more sequential devices based on the preferred logic state, at 212. For example, based on the preferred logic state identified for each sequential device at step 208, one or more sequential devices may be adjusted so as to reduce a soft error failure in time (FIT) rate associated with each of the sequential devices of the received RTL input data file. To illustrate, a sequential device such as a target FF may be identified as having a preferred logic state of holding a logic value of 1. The adjusting may enable the replacement of the target FF with a modified FF device that is optimized to hold a logic value 1 (e.g., holding a logic value 1 at a FF output node, conventionally designated as Q). In a particular embodiment, the adjustment may enable the replacement of another target FF (having a preferred state of 0) with a modified FF device that is optimized to hold a logic value 0 (e.g., holding a logic value 0 at a FF output node). In another embodiment, the adjusting may include the modification of a layout corresponding to the target FF. In another embodiment, the adjusting the one or more sequential devices may be based on the one or more commands of step 210 that specify the preferred logic state(s) of one or more FF devices. The step at 212 may substantially correspond (e.g., with similar embodiments) to the step 106 of FIG. 1.

The method 200 also includes generating a circuit data file that includes the adjusted one or more sequential devices (e.g., FFs), at 214. For example, based on the preferred logic state identified for each sequential device at step 208, one or more sequential devices are adjusted and a circuit data file may be generated that has the adjusted one or more sequential devices. In another embodiment, the generated circuit data file may be based on the one or more commands of step 210 that specify the preferred logic state of FF devices. The step at 214 may substantially correspond (e.g., with similar embodiments) to the step 108 of FIG. 1.

Although the steps 202-214 of the method 200 are shown as being performed sequentially, it will be appreciated that two or more of these steps could be performed in a different order or in parallel. In an exemplary embodiment, steps 208-214 may occur after receiving the input data of step 202. Alternatively or in addition, steps of the method 200 may be associated with other IC design steps, such as one or more engineering change order (ECO) steps. The method 200 may provide a reduction of soft error FIT rates associated with one or more sequential devices and enable the differentiation and selection of different sequential devices as part of an RTL design phase. Such provisions of the method 200 may enable improvements in the performance, reliability of an IC design with improved efficiency of the IC design flow.

Figure 3:
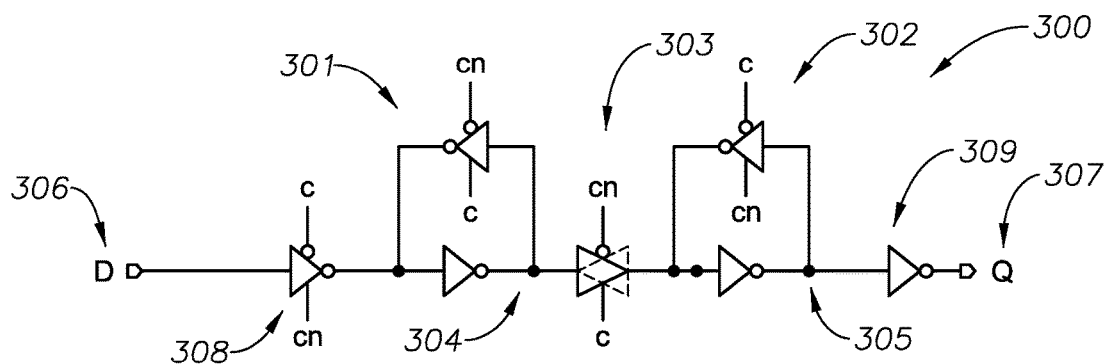
FIG. 3 is a diagram that illustrates an exemplary design of a sequential device associated with the present techniques and methods described herein.

Referring to FIG. 3, a circuit diagram schematically illustrating an exemplary design of a sequential device is shown and generally designated 300. The sequential device 300 represents a current flip-flop (FF) device that includes a master latch 301 and a slave latch 302. The FF 300 also includes a transmission gate 303 coupled between the master latch 301 and the slave latch 302. The FF 300 also includes an input D 306 and an output Q 307. The FF 300 also includes a tri-state inverter 308 coupled between the input D 306 and the master latch 301. The FF 300 further includes an inverter 309 coupled between the slave latch 302 and the output Q 307. The master latch 301 and the slave latch 302 may each comprise an inverter coupled to a clocked tri-state inverter. The master latch 301 may have a master output node 304 while the slave latch 302 may have a slave output node 305.

During operation, the master output node 304 may exhibit a logic value that is complimentary to a logic value that is exhibited by the slave output node 305. For example, for a particular clock cycle of operation, when the master output node 304 has a logic value of 0, the slave output node 305 may have a logic value of 1. To illustrate, for a particular clock cycle of operation where a clock signal (c) is low and an inverse clock signal (cn) is high and the input D 306 has a logic value of 0, the output Q 307 may have a corresponding logic value of 0. For this case, the master output node 304 may have a logic value of 0, while the slave output node 305 will have a logic value of 1 which is complimentary to the master output node 304. The FF 300 may represent a sequential device that is part of the one or more sequential devices of FIG. 1 and/or FIG. 2.

Figure 4:
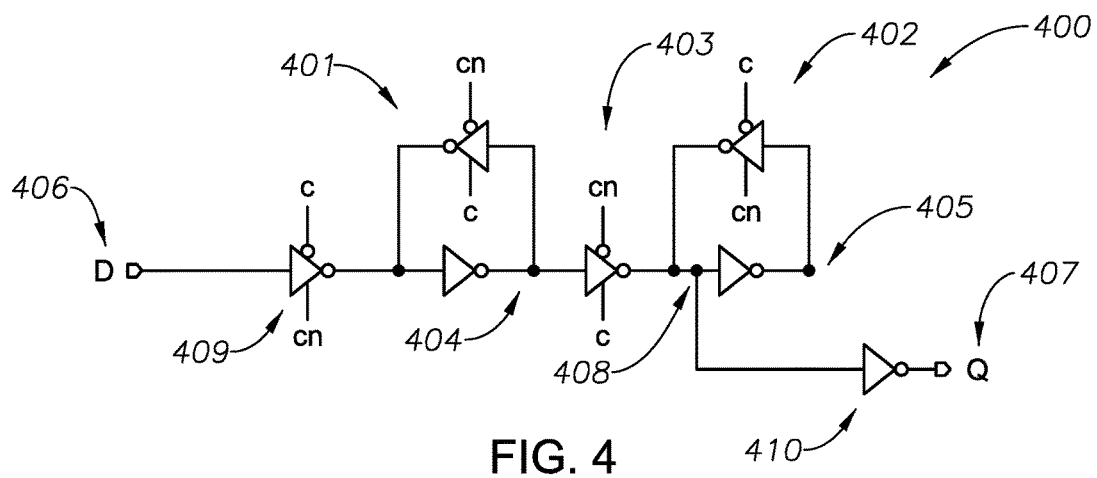
FIG. 4 is a diagram that illustrates an exemplary design of a modified sequential device used in a method in accordance with one embodiment.

Referring to FIG. 4, a circuit diagram schematically illustrating an exemplary design of a modified sequential device is shown and generally designated 400. The modified sequential device 400 represents a modified flip-flip (FF) device that includes a master latch 401 and a slave latch 402. In comparison to the FF 300 of FIG. 3, the modified FF 400 includes a tri-state inverter 403 coupled between the master latch 401 and the slave latch 402. The modified FF 400 also includes an input D 406 and an output Q 407. The modified FF 400 also includes another tri-state inverter 409 coupled between the input D 406 and the master latch 401. In comparison to the FF 300 of FIG. 3, the modified FF 400 further includes an inverter 410 coupled between the tri-state inverter 403 and the output Q 407 at a slave input node 408. The master latch 401 and the slave latch 402 may each comprise an inverter coupled to a clocked tri-state inverter. The master latch 401 may have a master output node 404 while the slave latch 402 may have a slave output node 405. The modified FF 400 may be used as part of the adjusting of the one or more sequential devices of FIG. 1 and/or FIG. 2.

During operation, the slave output node 405 may be driven to exhibit a logic value that is the same as the logic value exhibited by the master output node 404. For example, for a particular clock cycle of operation, when the master output node 404 has a logic value of 1, the slave output node 405 may be driven to also have a logic value of 1. To illustrate, for a particular clock cycle of operation where a clock signal (c) is low and an inverse clock signal (cn) is high and the input D 406 has a logic value of 1, the output Q 407 may have a corresponding logic value of 1. For this case, the master output node 404 will have a logic value of 1, while the slave output node 405 will also have a logic value of 1. The modified FF 400 may be used as part of the adjusting of the one or more sequential devices of FIG. 1 and/or FIG. 2.

The modified sequential device 400 represents a modified FF device that is skewed to hold a particular logic value against soft errors. For example, the modified FF 400 is configured to hold a logic value of 1 at the master output node 404 while also holding a logic value of 1 at the slave output node 405. In this way, the modified FF 400 is skewed to more strongly hold a logic value (in this case a logic value of 1) at its master and slave latches against potential soft errors. Accordingly, the modified FF 400 may exhibit a reduced soft error FIT rate in comparison to a FIT rate associate with an unmodified FF (such as the FF 300 of FIG. 3 or the one or more sequential devices of FIG. 1 and/or FIG. 2). Additionally, the modified FF 400 is configured to provide a particular logic value at the output Q 407. For example, the output Q 407 is configured to be coupled (via an inverter) to the slave input node 408. For a particular clock cycle of operation, the output Q 407 is configured to exhibit a logic value of 1. Accordingly, the modified FF 400 is optimized to hold (at the output Q 407) a logic value 1. In this way, the modified FF 400 can be selectively used to adjust one or more sequential devices that have been identified as having a preferred logic state of holding a logic value of 1. For example, a sequential device with a preferred logic state of 1 may be adjusted with the modified FF 400 that is configured to exhibit a logic value of 1 and which exhibits a reduced soft error FIT. Utilizing the modified FF 400 in this manner may enable the reduction of soft error FIT rates for one or more sequential devices of an IC design.

Figure 5:
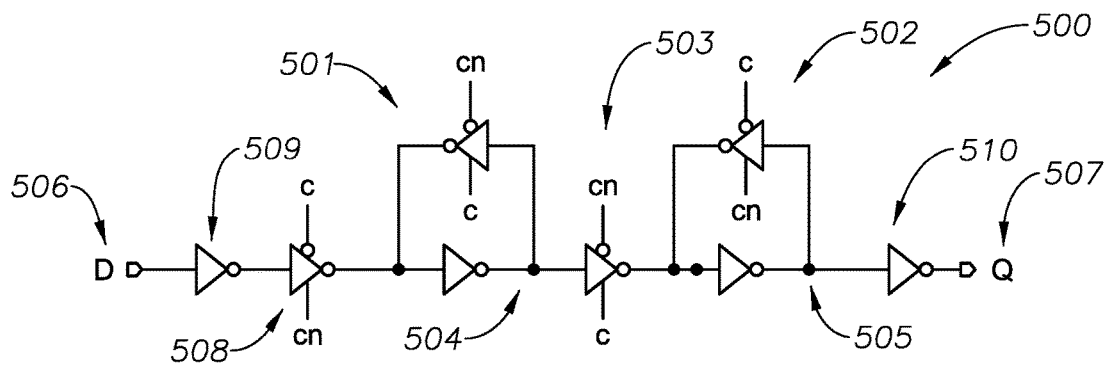
FIG. 5 is a diagram that illustrates an exemplary design of a second modified sequential device used in a method in accordance with one embodiment.

Referring to FIG. 5, a circuit diagram schematically illustrating an exemplary design of a second modified sequential device is shown and generally designated 500. The second modified sequential device 500 represents a second modified flip-flip (FF) device that includes a master latch 501 and a slave latch 502. In comparison to the FF 300 of FIG. 3, the second modified FF 500 includes a tri-state inverter 503 coupled between the master latch 501 and the slave latch 502. The second modified FF 500 also includes an input D 506 and an output Q 507. In comparison to the FF 400 of FIG. 4, the second modified FF 500 includes a first inverter 509 coupled to the input D 506. The second modified FF 500 also includes another tri-state inverter 508 coupled between the master latch 501 and the first inverter 509. In comparison to the FF 400 of FIG. 4, the second modified FF 500 further includes another inverter 510 coupled between the slave latch 502 and the output Q 507. The master latch 501 and the slave latch 502 may each comprise an inverter coupled to a clocked tri-state inverter. The master latch 501 may have a master output node 504 while the slave latch 502 may have a slave output node 505. The second modified FF 500 may be used as part of the adjusting of the one or more sequential devices of FIG. 1 and/or FIG. 2.

During operation, the slave output node 505 may be driven to exhibit a logic value that is the same as the logic value exhibited by the master output node 504. For example, for a particular clock cycle of operation, when the master output node 504 has a logic value of 1, the slave output node 505 may be driven to also have a logic value of 1. To illustrate, for a particular clock cycle of operation where a clock signal (c) is low and an inverse clock signal (cn) is high and the input D 506 has a logic value of 0, the output Q 507 may have a corresponding logic value of 0. For this case, the master output node 504 will have a logic value of 1, while the slave output node 505 will also have a logic value of 1. The second modified FF 500 may be used as part of the adjusting of the one or more sequential devices of FIG. 1 and/or FIG. 2.

The second modified sequential device 500 represents a second modified FF device that is skewed to hold a particular logic value against soft errors. For example, in a similar way as the modified FF 400 of FIG. 4, the second modified FF 500 is configured to hold a logic value of 1 at the master output node 504 while also holding a logic value of 1 at the slave output node 505. The second modified FF 500 is also skewed to more strongly hold a logic value (in this case a logic value of 1) at its master and slave latches against potential soft errors. Accordingly, the second modified FF 500 may exhibit a reduced soft error FIT rate in comparison to a FIT rate associate with an unmodified FF (such as the FF 300 of FIG. 3 or the one or more sequential devices of FIG. 1 and/or FIG. 2). In contrast to the modified FF 400 of FIG. 4, the second modified FF 500 is configured to provide a particular logic value at the output Q 507 that is different than that provided by the modified FF 400 of FIG. 4. For example, the output Q 507 is configured to be coupled to the slave output node 505. Accordingly, for a particular clock cycle of operation, the output Q 507 is configured to exhibit a logic value of 0. In this way, the second modified FF 500 is optimized to hold (at the output Q 507) a logic value 0. Accordingly, the second modified FF 500 can be selectively used to adjust one or more sequential devices that have been identified as having a preferred logic state of holding a logic value of 0. In this way a sequential device with a preferred logic state of 0 may be adjusted with the second modified FF 500 that exhibits a reduced soft error FIT rate. Utilizing the second modified FF 500 in this manner may enable the reduction of soft error FIT rates for one or more sequential devices of an IC design.

The modified FF 400 of FIG. 4 and the second modified FF 500 of FIG. 5 may both be utilized individually or in combination to adjust one or more sequential devices (e.g., the one or more sequential devices of FIG. 1 and/or FIG. 2.) of an IC design. In a particular embodiment, the modified FF 400 and the second modified FF 500 may be part of a standard cell library of an IC design associated with a particular process technology. Use of either the modified FF 400 or the second modified FF 500 may enable the reduction of soft error FIT rates associated with sequential devices of an IC design. Furthermore, the modified FF 400 and the second modified FF 500 may enable the adjustment of different selected sequential devices as part of an RTL design phase. Such attributes of these modified FFs may enable improvements in the performance, reliability of an IC design with improved efficiency of the IC design flow.

Figure 6A:
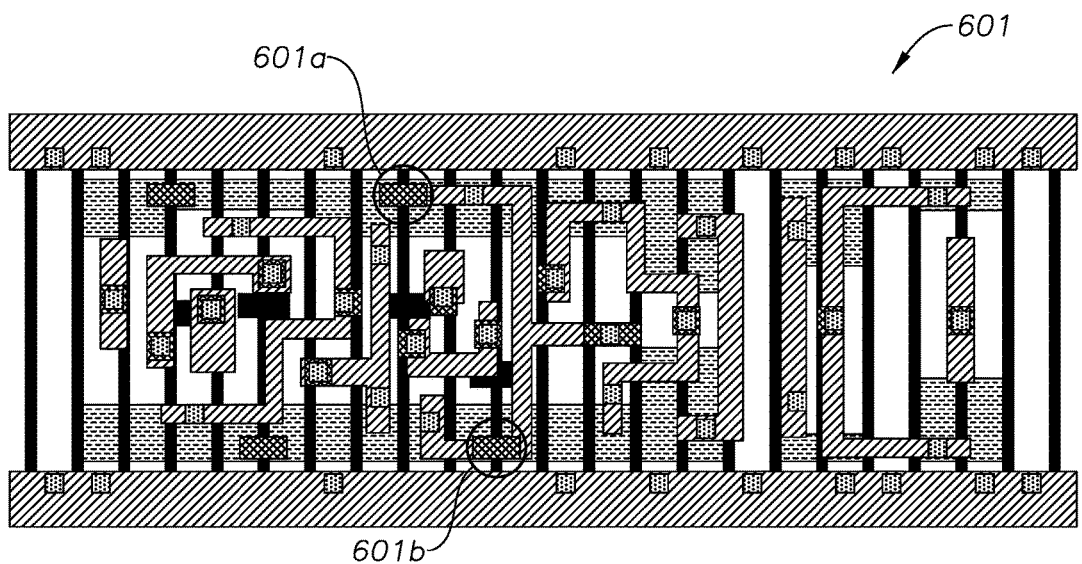
FIG. 6A is a diagram that illustrates an exemplary layout design of a sequential device associated with the present techniques and methods described herein.

Referring to FIG. 6A, a layout illustrating an exemplary sequential device is shown and generally designated 601. The layout 601 may represent a FF device that includes a master latch and a slave latch. The layout 601 may further represent other circuitry associated with the FF device, such as clock circuitry. The layout 601 may correspond to a sequential device of the one or more sequential devices of FIG. 1 or FIG. 2, or the FF 300 of FIG. 3. The layout 601 may include representations of "operational" transistors, "dummy" transistors, and other circuitry (e.g., interconnect, input/outputs, etc.). For example, the layout 601 may include dummy transistors 601a and 601b. In a non-limiting embodiment, dummy transistors 601a and 601b and/or operational transistors may be the target of modification that may result in a modified layout to be used as part of an adjustment step (the adjustment step of 106 of FIG. 1 and/or the adjustment step of 212 of FIG. 2). The modification may include, but is not limited to, a re-ordering, a re-sizing, or a re-arranging of one or more dummy transistors (e.g., 601a and 601b) and/or operational transistors. For example, the modification may enable the arrangement of dummy transistors away from nodes of the layout that may be prone/more sensitive to particles strikes (e.g., neutrons, alpha particles, etc.). The resulting modified layout may provide a reduced soft error FIT rate for an associated FF (e.g., a sequential device of the one or more sequential devices of FIG. 1 or FIG. 2, or the FF 300 of FIG. 3).

Figure 6B:
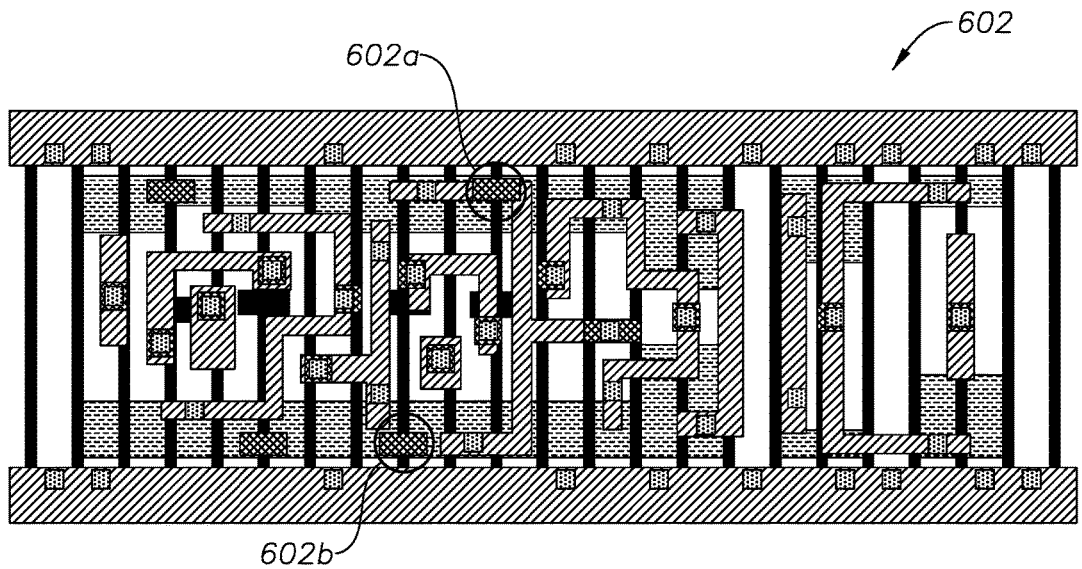
FIG. 6B is a diagram that illustrates an exemplary modified layout design of a sequential device used in a method in accordance with one embodiment.

Referring to FIG. 6B, a modified layout illustrating an exemplary modified sequential device is shown and generally designated 602. The modified layout 602 may be a modified version of the FF represented in the layout 601 of FIG. 6A. The modified layout 602 may correspond to the one or more layout modifications associated with the adjusting steps 106 of FIG. 1 and/or 212 of FIG. 2. The modified layout 602 may include representations of "operational" transistors, "dummy" transistors, a subset of transistors that have been modified, and other circuitry (e.g., interconnect, input/outputs, etc.). For example, in comparison to the dummy transistors 601a and 601b of FIG. 1, the modified layout 602 may include modified dummy transistors 602a and 602b. In a non-limiting embodiment, the modified layout 602 may include modified dummy transistors, modified operational transistors, or a combination of both. The modification may include, but is not limited to, the re-ordering, the re-sizing, or the re-arranging of one or more dummy transistors (e.g., 601a and 601b) and/or operational transistors to form the modified operational transistors and/or modified dummy transistors (e.g., 602a and 602b). For example, modified dummy transistors 602a and 602b may be situated away from layout nodes prone/more sensitive to particles strikes and arranged near layout nodes less prone/more sensitive to particles strikes (e.g., neutrons, alpha particles, etc.). In this manner, the modified dummy transistors 602a and 602b (and/or re-ordered operational transistors) may provide for reduced particle strike areas of the modified layout 602. Accordingly, the modified layout 602 may provide a reduced soft error FIT rate for the representative FF. The modified layout 602 may be used to adjust a FF (e.g., a sequential device of the one or more sequential devices of FIG. 1 or FIG. 2, or the FF 300 of FIG. 3) of an IC design to provide a reduced soft error FIT rate for the FF and corresponding IC design. Aspects of the reduction in soft errors FIT rates resulting from the modified layout 602 may be further described with reference to FIGS. 7A and 7B.

Referring to FIG. 7A, a graph illustrating a particle strike distribution associated with an exemplary layout design is shown and generally designated 701. The graph 701 is an exemplary "stencil" representation of a FF layout that corresponds to the exemplary layout 601 of FIG. 6A. The graph 701 illustrates an exemplary particle strike distribution associated with a particular FF layout (e.g., the layout 601 of FIG. 6A). The graph 701 shows locations 701a and 701b of exemplary "dummy" transistors and shows particle strike distribution areas 703 and 705. Areas 703 and 705 each represent a distribution of particle strike frequency for a particular layout area of a FF layout (e.g., the layout 601 of FIG. 6A). For example, distribution area 705 may include one or more distribution sub-areas, such as sub-areas 707 and 709. To illustrate, the sub-area 709 (e.g., the oval with thick stippled dot pattern) represents an area of the layout that is most prone to particle strikes while the sub-area 707 (e.g., the oval with thin stippled dot pattern) represents an area of the layout that is least prone to particle strikes. The distribution area 705 may include other sub-areas (e.g., the ovals with checkered and striped patterns) that indicate different degrees of particle strike likelihood that are between the most prone and least prone particle strike areas.

Similarly, the distribution area 703 may include one or more distribution sub-areas, such as sub-areas 711 and 715. The sub-area 715 (e.g., the oval with the checkered pattern) represents an area of the layout that has a greater likelihood for particle strikes than the sub-area 711 (e.g., the oval with the thin stippled dot pattern) which represents another area of the layout that is least prone to particle strikes. As illustrated in the graph 701, the sub-area 709 encompasses an area that has a width 709a, while the sub-area 707 encompasses an area that has a width 707a which is wider than width 709a. For the exemplary particle strike distributions of graph 701, the sub-area 709 has a width 709a that may span across approximately three diffusions and the sub-area 707 has a width 707a that may span across approximately five diffusions. Similarly, the sub-area 715 encompasses an area that has a width 715a, while the sub-area 711 encompasses an area that has a width 711a which is wider than width 715a. For the exemplary particle strike distributions of graph 701, the sub-area 715 has a width 715a that may span across approximately one diffusion.

The graph 701 may illustrate an exemplary particle strike distribution associated with a sequential device that has not been adjusted based on a preferred logic state. For example, the graph 701 may be a particle strike distribution associated with the one or more sequential devices (prior to an adjustment) of the method 100 of FIG. 1, the method 200 of FIG. 2, or the sequential device 300 of FIG. 3. The graph 701 may be used as part of a comparison with another graph (e.g., graph 702 of FIG. 7B) that illustrates another exemplary particle strike distribution associated with a sequential device that has been adjusted based on a preferred logic state. For example, a sequential device may be adjusted using the method 100 of FIG. 1 or the method 200 of FIG. 2. The adjustment may include the use of a modified layout (e.g., the modified layout 602 of FIG. 6B) associated with the sequential device. As a result of the layout modification, the sequential device may be adjusted and may exhibit a different particle strike distribution that has a reduced particle strike distribution and a corresponding reduced soft error FIT rate for the adjusted sequential device.

Referring to FIG. 7B, a graph illustrating a reduced particle strike distribution associated with an exemplary layout design is shown and generally designated 702. The graph 702 is an exemplary "stencil" representation of a FF layout that corresponds to the exemplary layout 602 of FIG. 6B. The graph 702 illustrates an exemplary reduced particle strike distribution associated with the particular FF layout (e.g., the exemplary layout 602 of FIG. 6B). The graph 702 may illustrate an exemplary particle strike distribution associated with a sequential device that has been adjusted based on a preferred logic state. The graph 702 shows modified locations 702a and 702b of exemplary "dummy" transistors and shows reduced particle strike distribution areas 704 and 706. In comparison to areas 703 and 705 of FIG. 7A, areas 704 and 706 each represent a reduced distribution of particle strike frequency for a particular layout area of the FF layout (e.g., the layout 602 of FIG. 6B). For example, reduced distribution area 706 may include one or more reduced distribution sub-areas, such as sub-areas 708 and 710. To illustrate, the sub-area 710 (e.g., the oval with thick stippled dot pattern) represents an area of the layout whose area (that is most prone to particle strikes) has been reduced when compared to sub-area 709 of FIG. 7A. The sub-area 708 (e.g., the oval with thin stippled dot pattern) represents an area of the layout whose area (that is least prone to particle strikes) has also been reduced. The distribution area 706 may include other reduced sub-areas (e.g., the ovals with checkered and striped patterns).

In comparison to the distribution area 703 of FIG. 7A (which has two distribution sub-areas), the reduced distribution area 704 may include a single distribution sub-area, such as a reduced distribution sub-area 712. The sub-area 712 (e.g., the oval with the thin stippled dot pattern) represents another area of the layout whose area (that is least prone to particle strikes) has been reduced. As illustrated in the graph 702, the reduced sub-area 710 encompasses an area that has a reduced width 710a and the reduced sub-area 708 encompasses an area that has a reduced width 708a. For the exemplary particle strike distributions of graph 702, the sub-area 710 has a reduced width 710a that may span across approximately less than two diffusions and the sub-area 708 has a reduced width 708a that may span across approximate less than four diffusions. Similarly, the sub-area 712 encompasses an area that has a reduced width 712a. For the exemplary particle strike distributions of graph 702, the sub-area 712 has a width 712a that may span across approximate one diffusion.

The graph 701 may illustrate an exemplary particle strike distribution for a sequential device that has not been adjusted while graph 702 illustrates an exemplary reduced particle strike distribution for a sequential device that has adjusted using the methods described herein (e.g., method 100 of FIG. 1 or the method 200 of FIG. 2). In comparison to the particle strike distribution areas 703 and 705 of FIG. 7A, the particle strike distribution areas 704 and 706 of FIG. 7B each exhibit reductions in sub-area widths and the elimination of a particular sub-area (e.g., the sub-area 715 of area 703 is not exhibited in the particle strike distribution area 704). The resulting reductions in particle strike distribution areas associated with a sequential device that has been adjusted (e.g., by layout modification) may correspond to a reduced soft error FIT rate for an adjusted sequential device (e.g., an adjusted FF). Accordingly, the adjustment of one or more sequential devices in which a modified layout is utilized, may enable the reduction of soft error FIT rates associated with sequential devices of an IC design.

Figures 8A, 8B:
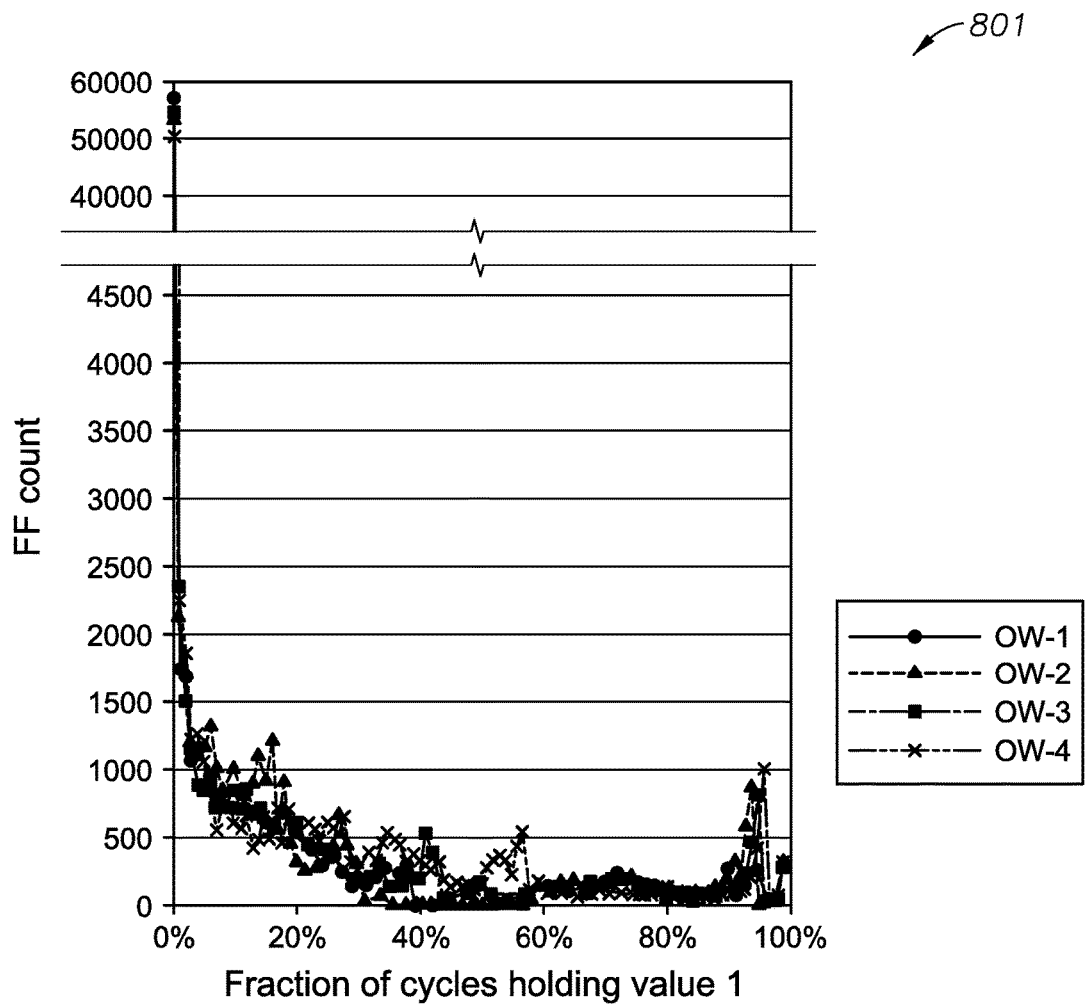
FIG. 8A is a graph illustrating exemplary results of associated with a method in accordance with one embodiment.
FIG. 8B is a table illustrating exemplary results associated with the present techniques and methods described herein.

Referring to FIG. 8A, a graph illustrating exemplary results of an evaluation step that is part a method for reducing FIT errors associated with one or more sequential devices of a circuit design is shown and generally designated 801. The exemplary results of graph 801 may be associated with the methods described herein. For example, the exemplary results of graph 801 may correspond to results of the evaluation step of the method 200 of FIG. 2. The graph 801 may be associated with the simulation or emulation of one or more sequential devices (e.g., one or more FFs) of an IC design. For example, an IC design may have a plurality of FFs that are each simulated utilizing one or more operational workloads (OWs) associated with the IC design. The simulation/emulation may provide the exemplary results of graph 801. The graph 801 illustrates that over different OWs, the majority of simulated FFs are more often holding a value of logic 0 (i.e., most FFs are less often (small percentage of cycles) holding a logic 1). Such results may indicate that the majority of simulated FFs have a high probability of holding (e.g., strongly storing) a logic value of 0. The exemplary results illustrated in graph 801 may be used as part of one or more steps of the methods described herein (e.g., the step 106 of FIG. 1 or steps 204, 206, 208 of FIG. 2).

Referring to FIG. 8B, a table illustrating exemplary results associated with a method for reducing FIT errors associated with one or more sequential devices of a circuit design is shown and generally designated 802. The exemplary results of table 802 may correspond to results of the method 100 of FIG. 1 or to results of the method 200 of FIG. 2. Table 802 illustrates soft error FIT rates for modified and unmodified FFs that either hold a logic value 1 or a logic value 0. Modifications may include layout modification A (e.g., the modified slave portion of a FF), layout modification B (e.g., the modified master portion of the FF), and device modification (e.g., the use of modified FFs such as the modified sequential devices of FIGS. 4 and 5). Table 802 illustrates that FFs holding a logic value of 1 may exhibit reduced FIT rates when the FFs are either adjusted with a modified FF (e.g., device modification) or are adjusted with a layout modification to the slave portion of the FF (e.g., layout modification A). Table 802 also illustrates that FFs holding a logic value of 0 may exhibit a reduced FIT rate when the FFs are adjusted with a layout modification to the master portion of the FFs (e.g., layout modification B). Table 802 further illustrates that the methods described herein (e.g., the method 100 of FIG. 1, the method 200 of FIG. 2) may provide a reduction of soft errors across a broad range of FIT rates and for different FFs having different preferred logic states.

Figure 9:
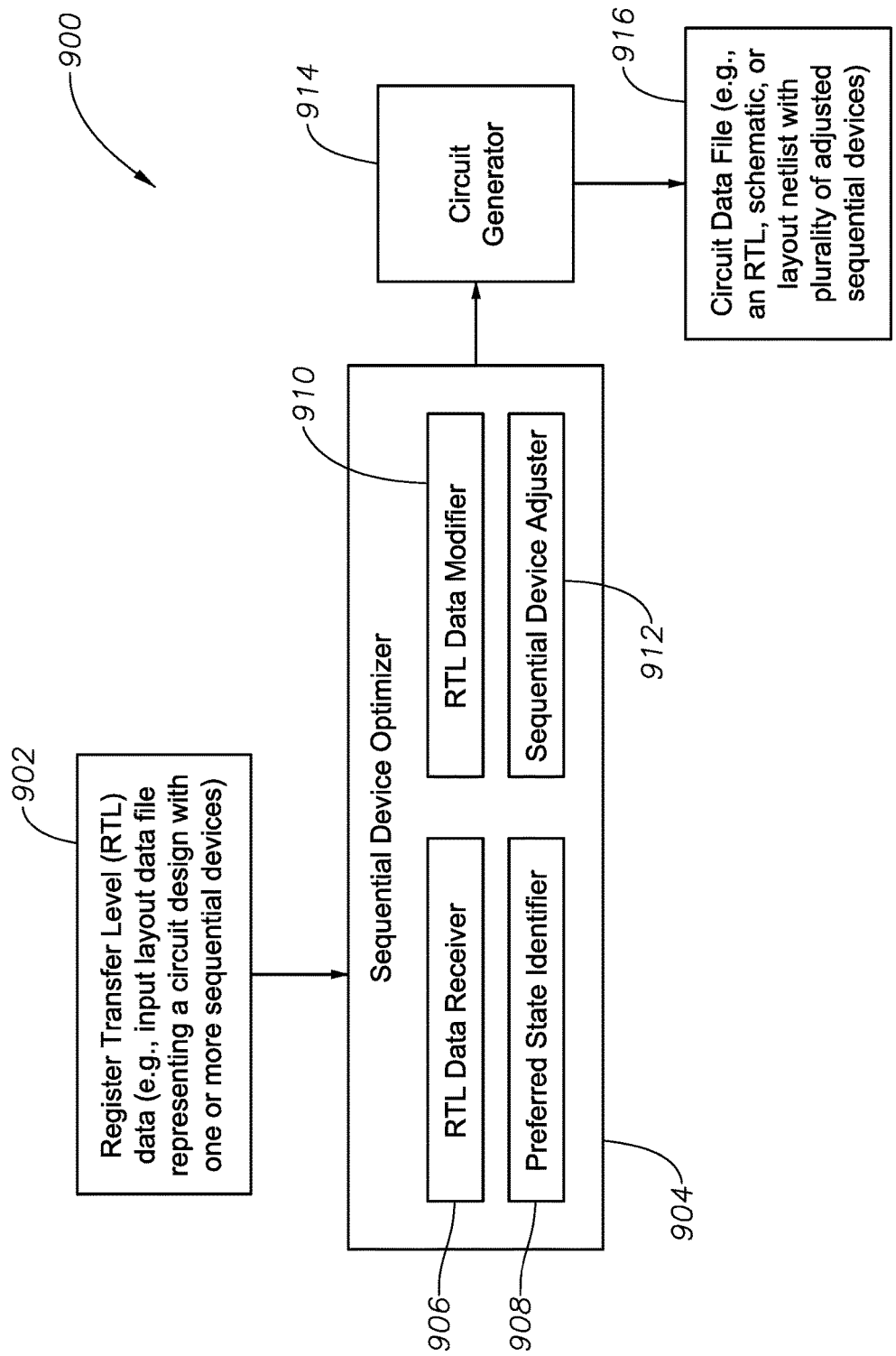
FIG. 9 is a block diagram schematically illustrating a system in accordance with the present techniques and methods described herein.

Referring to FIG. 9, a block diagram schematically illustrating a system in accordance with methods and techniques described herein is shown and generally designated 900. The system 900 includes a sequential device optimizer 904. The sequential device optimizer 904 may, among other functions, identify preferred logic states of sequential devices (e.g., FFs) and may adjust one or more sequential devices based on the identified preferred logic states. Changes to the one or more sequential devices may optimize the sequential devices to enable the reduction of soft error FIT rates for the one or more sequential devices associated with an IC design. The system 900 may perform the method 100 of FIG. 1 and/or the method 200 of FIG. 2.

The sequential device optimizer 904 includes an RTL data receiver 906, a preferred state identifier 908, an RTL data modifier 910, and a sequential device adjuster 912. The RTL data receiver 906 is configured to receive an input data file 902 that provides RTL data representing a circuit design that includes one or more sequential devices. The input data file 902 may also include other devices and circuit information represented within the RTL data as well as other information associated with standard cells of a process technology. The input data file 902 may be generated as part of an RTL design phase of an IC design flow. In a particular embodiment, the input data file 902 may be the result of a combination of electronic design automation (EDA) tools. For example, one or more circuit/layout simulation/emulation tools in combination with one or more HDL tools may be used to generate the input data file 902. The RTL data receiver 906 may be associated with the step 102 of the method 100 of FIG. 1 and/or the step 202 of the method 200 of FIG. 2.

The preferred state identifier 908 may process the input data file 902 to identify a preferred logic state for each sequential device of the one or more sequential devices of the IC design. For example, the preferred state identifier 908 may utilize the input data file 902 to identify the preferred logic state for each sequential device presented in the input data file 902. In another embodiment, preferred state identifier 908 may use other data files (e.g., schematic files, simulation/emulation files, RTL files, netlist files, etc.) that correspond to the one or more sequential devices to identify preferred logic states. The preferred state identifier 908 may identify preferred logic states based on a probability determination associated with the sequential devices, based on characteristics, operational modes, and/or properties of the sequential devices themselves and/or that of the IC design, or based on a combination thereof. The preferred state identifier 908 may be associated with the step 104 of the method 100 of FIG. 1 and/or the steps 204, 206, 208 of the method 200 of FIG. 2.

The RTL data modifier 910 may further process the input data file 902 based on the identified preferred logic state associated with the one or more sequential devices. For example, the RTL data modifier 910 may modify the received input data file 902 to include one or more commands that specify a preferred logic state for each of the one or more sequential devices. It is to be understood that the RTL data modifier 910 may provide other modifications to the received input data file 902. Such other modifications may include, but are not limited to, the inclusion of other devices and circuit information represented within the RTL data as well as other information associated with standard cells of a process technology. The RTL data modifier 910 may be associated with the step 210 of the method 200 of FIG. 2.

The sequential device adjuster 912 may further process the input data file 902 to adjust the one or more sequential devices (e.g., FFs) based on the preferred logic state. For example, based on the identified preferred logic state(s), the sequential device adjuster 912 may adjust the more or more sequential devices to enable reductions in soft error failure in time (FIT) rates associated with each of the sequential devices of the received input data file 902. The sequential device adjuster 912 may provide a variety of adjustments to sequential devices that include, but are not limited to, the modification of a layout corresponding to a FF, the replacement of the FF with a modified FF device that is optimized to hold (e.g., hold at an output Q) either a logic value 0 or a logic value 1, or a combination of both. In a particular embodiment, the sequential device adjuster 912 may provide adjustments based on the one or more commands associated with a modification made to the input data file 902.

It is to be understood that the sequential device adjuster 912 may provide other adjustments to the more or more sequential devices. The adjustments provided by the sequential device adjuster 912 may be associated with an RTL design phase, may be part of different design phases outside of the RTL design phase, or may be part of different design steps. For example, the sequential device adjuster 912 may be used as part of a circuit implementation phase, may be part of one or more engineering change order (ECO) steps, or may be associated with changes to FFs of a standard design flow. Adjustments made by the sequential device adjuster 912 may utilize or include other circuit devices and circuit information represented within RTL data, schematic data, or layout data, as well as other information associated with standard cells of a process technology. The sequential device adjuster 912 may be associated with the step 106 of the method 100 of FIG. 1 and/or the step 212 of the method 200 of FIG. 2.

The system 900 further includes a circuit generator 914 that may generate a circuit data file 916 based on the identified preferred logic states of one or more sequential devices and the adjustments made to the one or more sequential devices. In another embodiment, the circuit generator 914 may generate the circuit data file 916 based on the one or more commands of a modified input data file that may specify the preferred logic state of one or more sequential devices (e.g., FFs). The generated circuit data file 916 may include a plurality of adjusted sequential devices represented in the form of an RTL netlist, a schematic netlist, a layout netlist, or any combination thereof. The circuit generator 914 may be associated with an RTL design phase, may be part of different design phases outside of the RTL design phase, or may be part of different design steps. For example, the circuit generator 914 may be used as part of a circuit implementation phase or may be part of one or more engineering change order (ECO) steps. The circuit generator 914 may be associated with the step 108 of the method 100 of FIG. 1 and/or the step 214 of the method 200 of FIG. 2.

The circuit generator 914 may generate circuit data file 916 utilizing one or more sequential devices that are part of a standard cell library of a process technology associated with the IC design. The system 900 may enable the generation of the circuit data file 916 to include one or more sequential devices that have reduced soft error FIT rates.

Accordingly, the system 900 may provide an IC design with reduced soft error failure in time rates and a corresponding improvement in the performance and reliability for the IC design. The system 900 and its components (e.g., 902-916) may be implemented using individual hardware modules, individual software modules, one or more EDA tools, one or more HDL tools, or a combination thereof.

Figure 10:
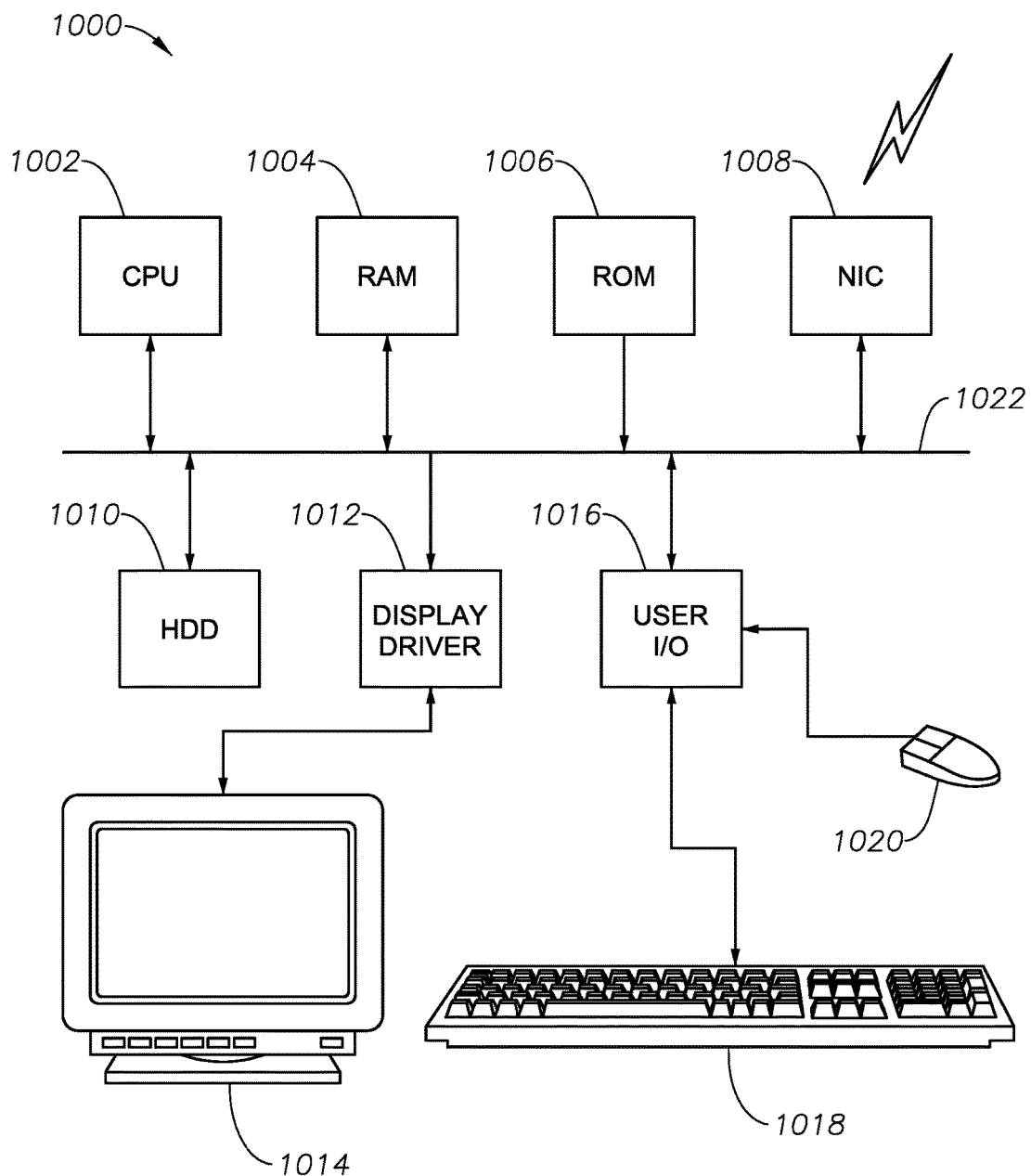
FIG. 10 illustrates a block diagram of a computer system in accordance with implementations of the present techniques and methods described herein.

Referring to FIG. 10, a block diagram schematically illustrating a general purpose computer of the type that may be used to implement the above described methods and techniques is shown and generally designated 1000. The general purpose computer 1000 includes a central processing unit 1002, a random access memory 1004, a read-only memory 1006, a network interface card 1008, a hard disk drive 1010, a display driver 1012, a user input/output circuit 1016 with a keyboard 1018 and mouse 1020, and a monitor 1014 all connected via a common bus 1022. In operation the central processing unit 1002 will execute computer program instructions that may be stored in one or more of the random access memory 1004, the read-only memory 1006 and the hard disk drive 1010, or dynamically downloaded via the network interface card 1008. The results of the processing performed may be displayed to a user via the display driver 1012 and the monitor 1014. User inputs for controlling the operation of the general purpose computer 1000 may be received via the user input/output circuit 1016 from the keyboard 1018 or the mouse 1020. It will be appreciated that the computer program could be written in a variety of different computer languages. The computer program may be stored and distributed on a recording medium or dynamically downloaded to the general purpose computer 1000.

When operating under control of an appropriate computer program, the general purpose computer 1000 can perform the above described methods and techniques (e.g., the methods 100 and/or 200 of FIGS. 1 and 2, respectively) and can be considered to form an apparatus for performing the above described methods and techniques. For example, the apparatus may include the system 900 of FIG. 9 or one or more components of the system 900 of FIG. 9. The architecture of the general purpose computer 1000 could vary considerably, and FIG. 10 is only one example Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A computer-implemented method for reducing failure-in-time (FIT) errors associated with one or more sequential devices of a circuit design for a process technology, the method comprising:
    receiving an input data file that includes register transfer level (RTL) data of the circuit design, wherein the RTL data includes the one or more sequential devices;
    identifying a preferred logic state for each sequential device of the one or more sequential devices; and
    adjusting the one or more sequential devices based on the preferred logic state,
    wherein the one or more sequential devices include one or more skewed flip-flops configured to store a value corresponding to a logic one or a logic zero.

2. The method of claim 1, wherein the one or more sequential devices comprise a master-slave flip-flop device.

3. The method of claim 1, wherein the identifying a preferred logic state is based on a probability distribution associated with the one or more sequential devices.

4. The method of claim 3, wherein a probability distribution includes the probability of each sequential device of the one or more sequential devices storing a value corresponding to a logic one or a logic zero.

5. The method of claim 1, wherein the identifying a preferred logic state is based on predetermined parameters of the circuit design.

6. The method of claim 1, wherein adjusting the one or more sequential devices includes use of one or more modified sequential devices, one or more layout modifications associated with the one or more sequential devices, or both.

7. The method of claim 1, further comprising generating a circuit data file that includes the adjusted one or more sequential devices.

8. The method of claim 7, wherein the generating a circuit data file is based on an engineering change order (ECO) that includes adjusting the one or more sequential devices with one or more modified sequential devices, one or more layout modifications associated with the one or more sequential devices, or both.

9. A computer-implemented method for reducing failure-in-time (FIT) errors associated with one or more sequential devices of a circuit design for a process technology, the method comprising:
    receiving an input data file that includes register transfer level (RTL) data of the circuit design, wherein the RTL data includes the one or more sequential devices;
    identifying a preferred logic state for each sequential device of the one or more sequential devices; and
    adjusting the one or more sequential devices based on the preferred logic state,
    wherein the adjusting the one or more sequential devices includes use of one or more modified sequential devices, one or more layout modifications associated with the one or more sequential devices, or both, and
    wherein the one or more modified sequential devices include one or more skewed flip-flops configured to store a value corresponding to a logic one or a logic zero.

10. A computer-implemented method for reducing failure-in-time (FIT) errors associated with one or more sequential devices of a circuit design for a process technology, the method comprising:
    receiving an input data file that includes register transfer level (RTL) data of the circuit design, wherein the RTL data includes the one or more sequential devices;
    identifying a preferred logic state for each sequential device of the one or more sequential devices; and
    adjusting the one or more sequential devices based on the preferred logic state,
    wherein the adjusting the one or more sequential devices includes use of one or more modified sequential devices, one or more layout modifications associated with the one or more sequential devices, or both, and
    wherein the one or more layout modifications include an arrangement of one or more matching transistors.

11. A computer-implemented method for reducing failure-in-time (FIT) errors associated with one or more sequential devices of a circuit design for a process technology, the method comprising:

receiving an input data file that includes register transfer level (RTL) data of the circuit design, wherein the RTL data includes the one or more sequential devices;

identifying a preferred logic state for each sequential device of the one or more sequential devices;

adjusting the one or more sequential devices based on the preferred logic state;

evaluating the one or more sequential devices with one or more workloads; and determining, for each sequential device of the one or more sequential devices, a probability of storing a value corresponding to a logic one or a logic zero based on a result of the evaluating.

12. A computer-implemented method for reducing failure-in-time (FIT) errors associated with one or more sequential devices of a circuit design for a process technology, the method comprising:

receiving an input data file that includes register transfer level (RTL) data of the circuit design, wherein the RTL data includes the one or more sequential devices;

identifying a preferred logic state for each sequential device of the one or more sequential devices;

adjusting the one or more sequential devices based on the preferred logic state; and generating a circuit data file that includes the adjusted one or more sequential devices, wherein the generating a circuit data file is based on an engineering change order (ECO) that includes adjusting the one or more sequential devices with one or more modified sequential devices, one or more layout modifications associated with the one or more sequential devices, or both, and wherein the one or more modified sequential devices and the one or more layout modifications are part of a standard cell library of the process technology.

13. A computer-implemented method for reducing failure-in-time (FIT) errors associated with one or more sequential devices of a circuit design for a process technology, the method comprising:

receiving an input data file that includes register transfer level (RTL) data of the circuit design, wherein the RTL data includes the one or more sequential devices;

identifying a preferred logic state for each sequential device of the one or more sequential devices;

adjusting the one or more sequential devices based on the preferred logic state; and modifying the RTL data to include one or more commands based on the preferred logic state associated with the one or more sequential devices.

14. The method of claim 13, further comprising generating a circuit data file that includes the adjusted one or more sequential devices, wherein the adjusted one or more sequential devices include one or more modified sequential devices, one or more layout modifications associated with the one or more sequential devices, or both.

15. The method of claim 14, wherein the one or more modified sequential devices and the one or more layout modifications are part of a standard cell library of the process technology.

16. The method of claim 14, wherein the generating a circuit data file is based on an engineering change order (ECO) that includes the adjusting the one or more sequential devices.

17. A device for reducing failure-in-time (FIT) errors associated with a circuit design for a process technology, the device comprising:

a first tri-state inverter coupled between an input and a first latch of the device; and a second tri-state inverter coupled between the first latch and a second latch of the device;

wherein the FIT errors are reduced by using the device to adjust one or more sequential devices of the circuit design based on a preferred logic state associated with each sequential device of the one or more sequential devices, and wherein the one or more sequential devices are part of an input data file that includes register transfer level (RTL) data of the circuit design.

18. The device of claim 17, wherein the first latch and the second latch are respectively configured to store a value corresponding to a same logic value.

19. The device of claim 18, further comprising a first configuration to store a value corresponding to a logic one or a second configuration to store a value corresponding to a logic zero.

20. A system for reducing failure-in-time (FIT) errors associated with one or more sequential devices of a circuit design for a process technology, the system comprising:

means for receiving an input data file that includes register transfer level (RTL) data of the circuit design, wherein the RTL data includes the one or more sequential devices;

means for identifying a preferred logic state for each sequential device of the one or more sequential devices; and means for adjusting the one or more sequential devices based on the preferred logic state associated with the one or more sequential devices, wherein the one or more sequential devices include one or more skewed flip-flops configured to store a value corresponding to a logic one or a logic zero.

* * * * *